(12) United States Patent
Smith

(10) Patent No.: US 12,382,943 B2
(45) Date of Patent: Aug. 12, 2025

(54) FISHING ROD RACK

(71) Applicant: Mathew Smith, Bend, OR (US)

(72) Inventor: Mathew Smith, Bend, OR (US)

( * ) Notice: Subject to any disclaimer, the term of this patent is extended or adjusted under 35 U.S.C. 154(b) by 220 days.

(21) Appl. No.: 18/084,319

(22) Filed: Dec. 19, 2022

(65) Prior Publication Data
US 2023/0240277 A1 Aug. 3, 2023

Related U.S. Application Data

(60) Provisional application No. 63/304,097, filed on Jan. 28, 2022.

(51) Int. Cl.
*A01K 97/10* (2006.01)

(52) U.S. Cl.
CPC .................... *A01K 97/10* (2013.01)

(58) Field of Classification Search
CPC ....... A01K 97/08; A01K 97/10; A47F 7/0021; Y10S 24/922; A47B 81/005
USPC ......... 224/406, 922; 211/70.8; 248/511–512, 248/539; 43/21.2; D22/147
See application file for complete search history.

(56) References Cited

U.S. PATENT DOCUMENTS

| | | | | |
|---|---|---|---|---|
| 4,014,466 A * | 3/1977 | Wess | ...................... | A01K 97/08 294/166 |
| 5,071,048 A * | 12/1991 | Price | ...................... | A01K 97/08 224/604 |
| 5,072,539 A * | 12/1991 | Greenberg | ............. | A01K 97/10 211/70.2 |
| 5,137,319 A * | 8/1992 | Sauder | .................... | A01K 97/10 294/143 |
| 5,450,688 A * | 9/1995 | Hall | ........................ | A01K 97/08 43/25 |
| 5,505,300 A * | 4/1996 | Joh | ......................... | A63B 55/40 206/315.6 |
| 5,678,348 A * | 10/1997 | Zielinski | ................. | A01K 97/08 43/21.2 |
| 6,471,103 B1 * | 10/2002 | Frese | ..................... | A01K 97/10 206/315.11 |
| 7,555,861 B1 * | 7/2009 | Zakarian | ................ | A01K 97/10 248/512 |
| 7,909,378 B2 * | 3/2011 | Alley | ..................... | A01K 97/08 43/25 |
| 8,783,748 B1 * | 7/2014 | Quinn | .................... | A01K 97/08 294/159 |
| D842,621 S * | 3/2019 | Snyder | ........................ | D6/552 |
| 2007/0278166 A1 * | 12/2007 | Morton | .................. | A01K 97/08 211/70.8 |

* cited by examiner

*Primary Examiner* — Scott T McNurlen
(74) *Attorney, Agent, or Firm* — Leber IP Law; Celia H. Leber

(57) ABSTRACT

Fishing rod racks are disclosed that are configured to receive one or more fishing rods, each rod including a base and a rod blank extending from the base. The racks include an elongated rigid tubular member; a rod base support, configured to receive the base(s), mounted adjacent a first end of the tubular member; and a rod blank support, configured to receive the rod blank(s), mounted on the tubular member spaced from the rod base support.

18 Claims, 25 Drawing Sheets

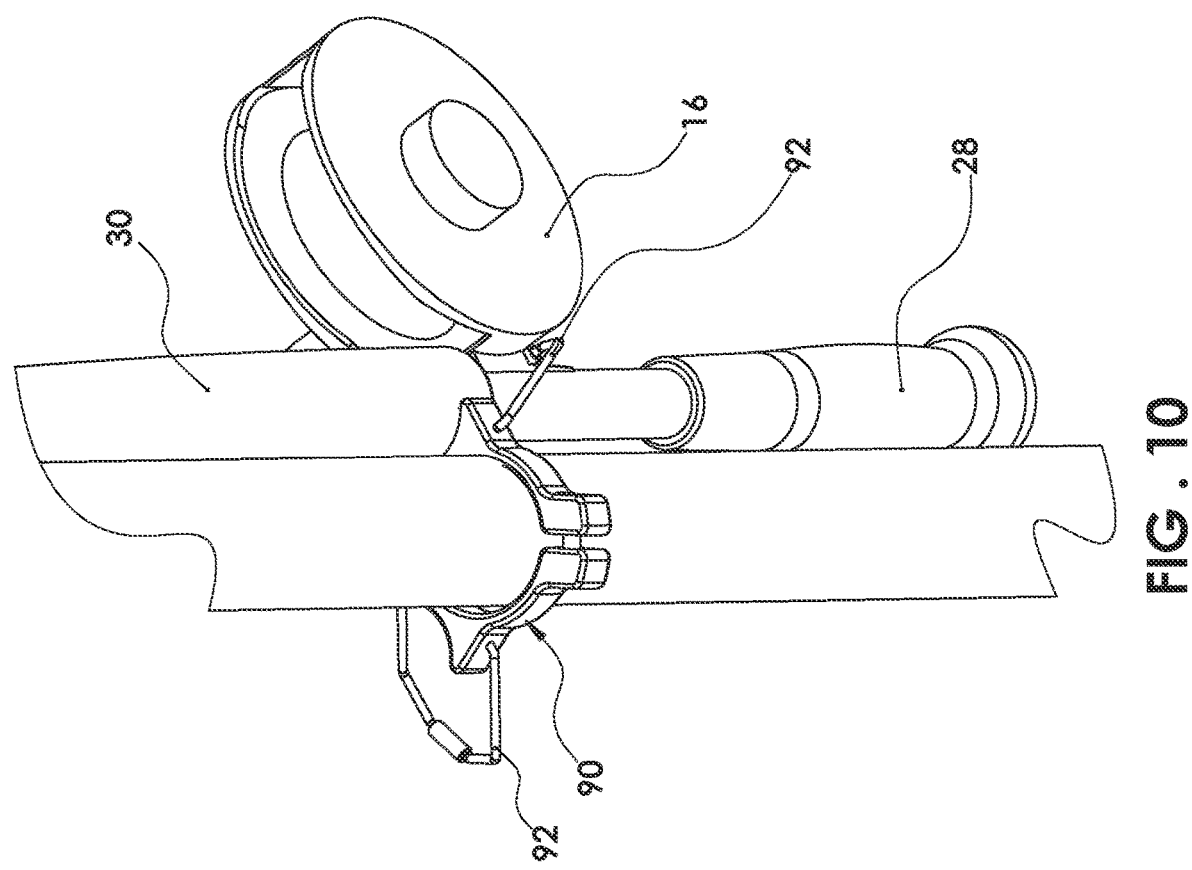

FISHING ROD RACK

RELATED APPLICATION

This application claims priority from U.S. Patent Application No. 63/304,097, filed Jan. 28, 2022, the entire disclosure of which is incorporated herein by reference.

BACKGROUND

Storage of fishing rods and reels is crucial to protect them from damage or breakage. Many anglers or groups of anglers carry multiple rods and reels to fishing locations. Often fishing is conducted from a boat either floating down a river, on a lake, or in the ocean. Moving around a small space in a boat can further jeopardize the rods and reels, potentially causing damage or breakage.

It is generally necessary to support the reel end of the rod and some position around the midpoint of the length of the rod blank (the long, thin cylindrical portion of the rod) to reduce the chance of breakage. Very few solutions exist that protect rods on smaller watercraft or while transporting on/in a vehicle. Human-powered boats, such as drift boats, rowboats, white water rafts, canoes, kayaks, and standup paddleboards, are limited in space and are a danger zone for rods. In these crafts, rods are typically stored on the floor, along the vertical walls, set across seats, or on raft tubes, putting them in danger of falling out of the boat, breakage from moving around the boat, or damage by gear shifting within the boat.

While fishing along a river, lake, or ocean bank, the storage of rods is necessary but primarily unavailable, causing anglers to set the rods on the ground, or prop them against land features such as rocks, trees, shrubs, or vehicles. When unseen, the rods are often damaged by the angler, other unaware people in the area, vehicles, or animals. In this scenario, an angler or group of anglers may have multiple rods that need a safe place to store the rod during lunch or a rest.

Fishing guides are often responsible for multiple rods and their safety while guests are fishing. With a lack of a safe spot for rods, they often use land features, prop them against vehicles, or lay them across boats. Unaware guests can easily damage or break the rods through stepping on them, leaning/sitting on them, closing doors, and other accidents.

There are generally two disciplines of anglers and accompanying fishing equipment, fly rods and spinning rods (also referred to as spin fishing rods). The shape and position of the reel are dissimilar in various types of fly and spin fishing rods. Fly rods are typically much longer than spin fishing rods and have a variety of butt options. Spin fishing rods come in a variety of form factors but typically include a similar geometry.

FIGS. 1-1C depict common form factors for fishing setups. FIG. 1 shows the handle end of a standard fly fishing rod 10, having a handle 12, a reel seat 14, a reel 16, a butt cap 18, and a rod blank 20. Rod blank 20 is much longer than illustrated, typically extending from 5 to 9 feet. The rod blank is often formed of carbon fiber, and is typically very lightweight and thin compared to other types of fishing rods. FIG. 1A shows a fly rod 22 with an extended portion 24 behind the reel called a "fighting-butt," FIG. 1B shows a two-handed fly rod 26 (often referred to as a spey rod) that has a large extension 28 behind the reel with a large knob-shaped grip-end 29, and an extended handle 30 in front of the reel 16 for two-handed operations.

FIG. 1C shows a standard spin fishing rod 32. Rod 32 has a very different type of reel 34 and has a major part of the handle 36 positioned behind the reel. Spin fishing rods come with a variety of reel geometries and shapes not depicted here.

SUMMARY

Devices are disclosed herein that provide for the capture, storage, and transport of fishing rods and reels. The devices disclosed herein may be configured for transporting rods on/in vehicles, watercraft, stationary storage such as a riverbank, or storing them inside a home or business.

The rod storage device is portable and interchangeable in its orientation, and adaptable to many environments and locations. In some embodiments, the apparatus is positioned vertically and retains the rods and reels in a vertical position; in others, the apparatus can be mounted horizontally for storage in a vehicle or home. The device is compatible with both fly and spin fishing rods/reels.

In one aspect, the disclosure features a fishing rod rack configured to receive one or more fishing rods, each rod including a base and a rod blank extending from the base, the rack comprising an elongated rigid tubular member; a rod base support, configured to receive the base(s), mounted adjacent a first end of the tubular member; and a rod blank support, configured to receive the rod blank(s), mounted on the tubular member spaced from the rod base support.

Some implementations include one or more of the following features.

The rod base support and the rod blank support each extend radially around a circumference of the tubular member. The tubular member is cylindrical. The rod base support is mounted to be removable by a user. The rod base support includes at least one rod base-receiving portion having a through hole configured to receive a fishing rod butt having a first diameter and a floor configured to receive a fishing rod butt having a second, larger diameter. Alternatively, or in addition, the rod base support comprises a mount and at least one wire holster extending radially from the mount, the wire holster having a loop configured to receive a fishing rod butt and support the fishing rod from under a reel. The mount extends radially around the tubular member. The wire holster is configured to be biased towards an open position in which the loop extends generally perpendicular to a longitudinal axis of the tubular member. The proximal ends of the loop are pivotably mounted on the mount in an offset manner so as to create tension in the loop when the loop is deflected away from the open position.

The rod blank support includes at least one rod blank-receiving portion including a resilient gripping member configured to surround a major portion of the circumference of the rod blank and maintain the rod blank in a position in which a longitudinal axis of the rod blank extends generally parallel to a longitudinal axis of the tubular member. The rod blank support includes a housing defining a cavity in which the resilient gripping member is disposed, the housing extending radially around the tubular member and being fixedly mounted thereto and having at least one open area configured to allow the rod blank to be inserted into the gripping member. The rod blank support further includes an outer member mounted radially around the tubular member and over the housing, the outer member being rotatable relative to the housing between an open position, in which the rod blank can be inserted into and removed from the gripping member, and a closed position in which the rod blank is locked in the rod blank support. The rotation of the outer member relative to the housing is limited by stops. The rod blank support further includes detents configured to retain the outer member in the open and closed positions.

The tubular member includes a central cavity configured for storage of a plurality of rod sections. The central cavity is segmented to allow the rod sections to be segregated into groups.

In another aspect, the disclosure features a fishing rod rack comprising (a) an elongated rigid tubular member; and (b) a rod blank support, configured to receive the rod blank(s), mounted on the tubular member, the rod blank support comprising (i) at least one rod blank-receiving portion including a resilient gripping member configured to surround a major portion of the circumference of the rod blank and maintain the rod blank in a position in which a longitudinal axis of the rod blank extends generally perpendicular to a longitudinal axis of the tubular member, and (ii) a housing defining a cavity in which the resilient gripping member is disposed, the housing extending radially around the tubular member and being fixedly mounted thereto and having at least one open area configured to allow the rod blank to be inserted into the gripping member.

Some implementations may include one or more of the following features, as well as any of the features enumerated above.

The rod blank support further includes an outer member mounted radially around the tubular member and over the housing, the outer member being rotatable relative to the housing between an open position, in which the rod blank can be inserted into and removed from the gripping member, and a closed position in which the rod blank is locked in the rod blank support. The rotation of the outer member relative to the housing is limited by stops. The rod blank support further includes detents configured to retain the outer member in the open and closed positions. The gripping members are formed of an elastomeric material or a foam. The gripping members are generally cylindrical and include a slit through which the rod blank can be pressed and a bore into which the rod blank is received, a length of the slit and a longitudinal axis of the bore extending generally parallel to a longitudinal axis of the tubular member. The tubular member is cylindrical.

The disclosure also features methods of using the racks disclosed herein. For example, the disclosure features a method of storing a fishing rod having a base and a rod blank extending from the base that includes (a) providing a fishing rod rack comprising (i) an elongated rigid tubular member; (ii) a rod base support, configured to receive the base(s), mounted adjacent a first end of the tubular member; and (iii) a rod blank support, configured to receive the rod blank(s), mounted on the tubular member spaced from the rod base support; (b) inserting the base of the rod into the rod base support; and (c) inserting a portion of the rod blank into the rod blank support.

Some implementations of the method may further include locking the rod blank in place in the rod blank support, and/or removing rod sections from the rod blank and storing the rod sections in a central cavity of the tubular member.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

DESCRIPTION OF THE DRAWINGS

FIG. 7A is a side view of the lower portion of the rack taken looking along the diameter of the reel towards the rod handle.

FIG. 7B is a cross-sectional view of the lower portion of the rack and the rod handle taken along line B-B in FIG. 7A.

FIG. 10 is an enlarged perspective view showing a lower portion according to an alternative embodiment in which the handle end of the rod is supported by a wire holster, with a rod in place.

DETAILED DESCRIPTION

Figure 2:
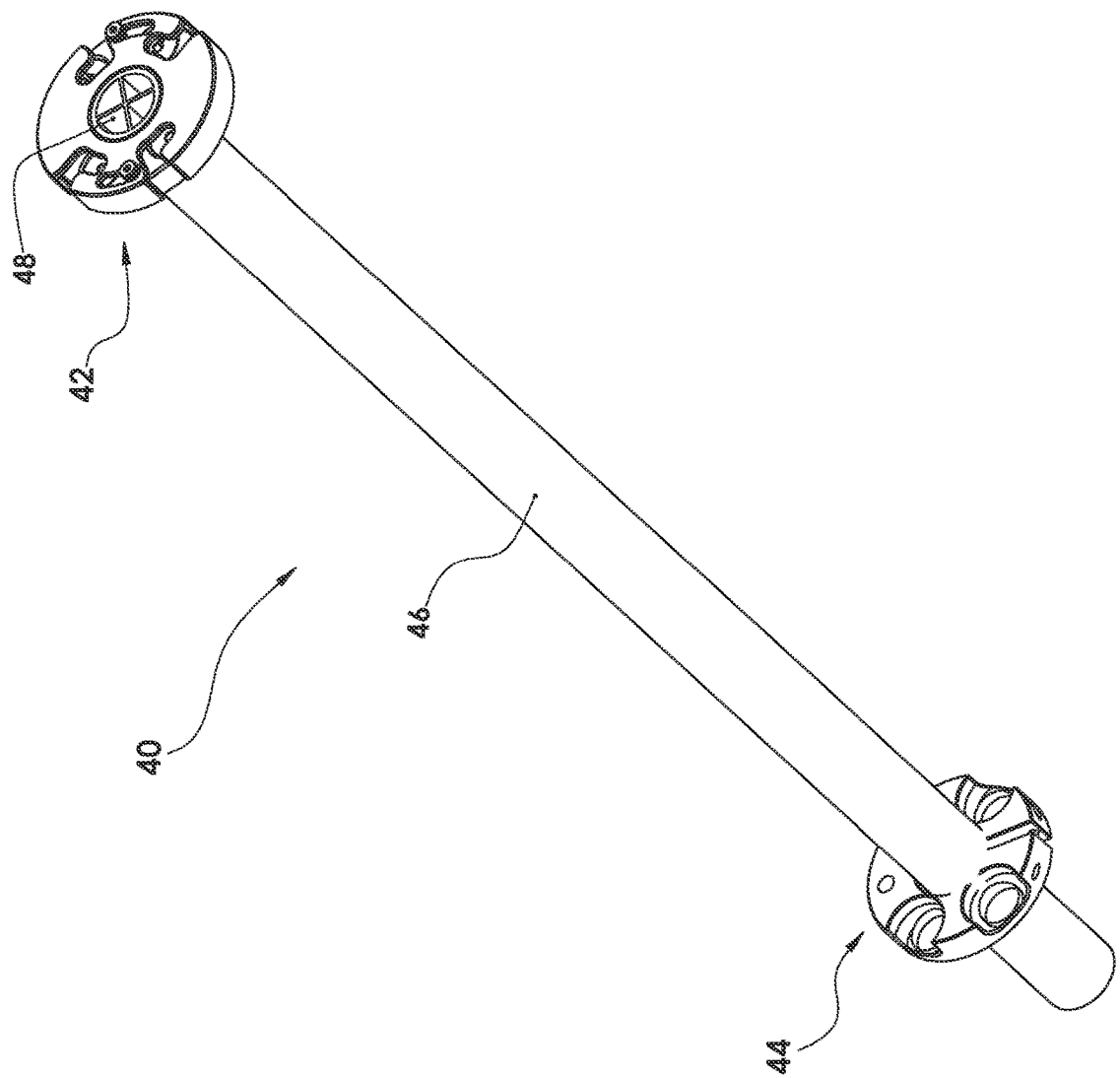
FIG. 2 is a perspective view showing a fishing rod rack according to one implementation.

Referring to FIG. 2, a fishing rod rack 40 according to one implementation includes an upper portion 42, a lower portion 44, and a cylindrical support 46 on which the upper and lower portions are mounted such that they extend radially around the cylindrical support. Fishing rods, generally with their reels in place as shown, insert into the rack in a radial pattern around the central structure. The radial nature of the retention provides space savings and allows a plurality of rods to be stored safely together in a single rack.

Figure 3:
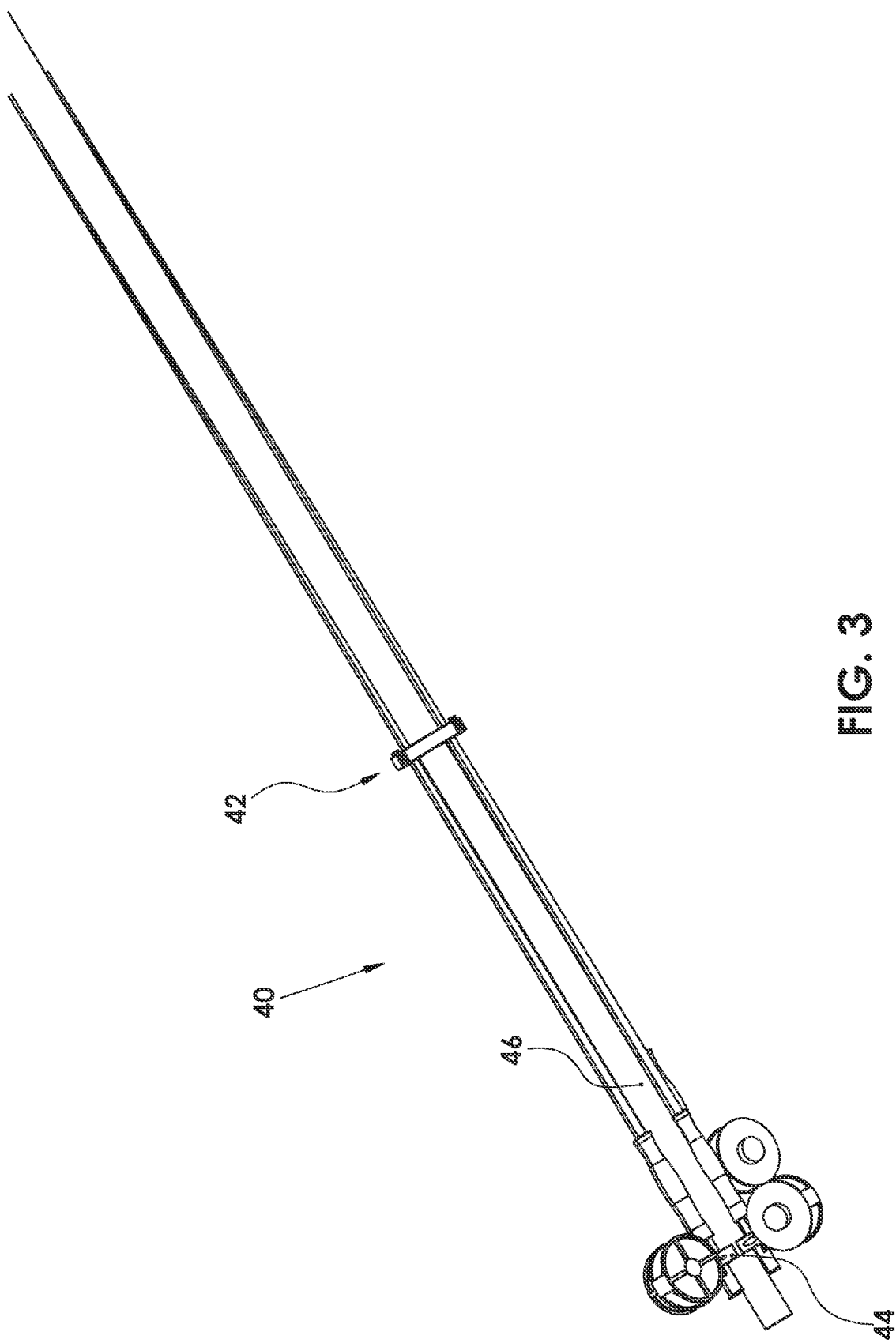
FIG. 3 is a perspective view of the rack of FIG. 2 with three fishing rods in place.

The upper portion 42 is configured to support the rod blanks of fishing rods while the lower portion 44 is configured to support the handle ends, as shown in FIG. 3. The cylindrical support 46 provides a rigid support for the upper and lower portion, protects the lengths of the rod blanks, and is in the form of a hollow tube to provide a segmented chamber 48 for safe storage for additional rod sections (see also FIG. 13). Removal of the additional rod sections allows a relatively shorter portion of rod blank to extend beyond the upper portion 42 and thus protects the fragile smaller diameter sections of the rod.

Figure 4:
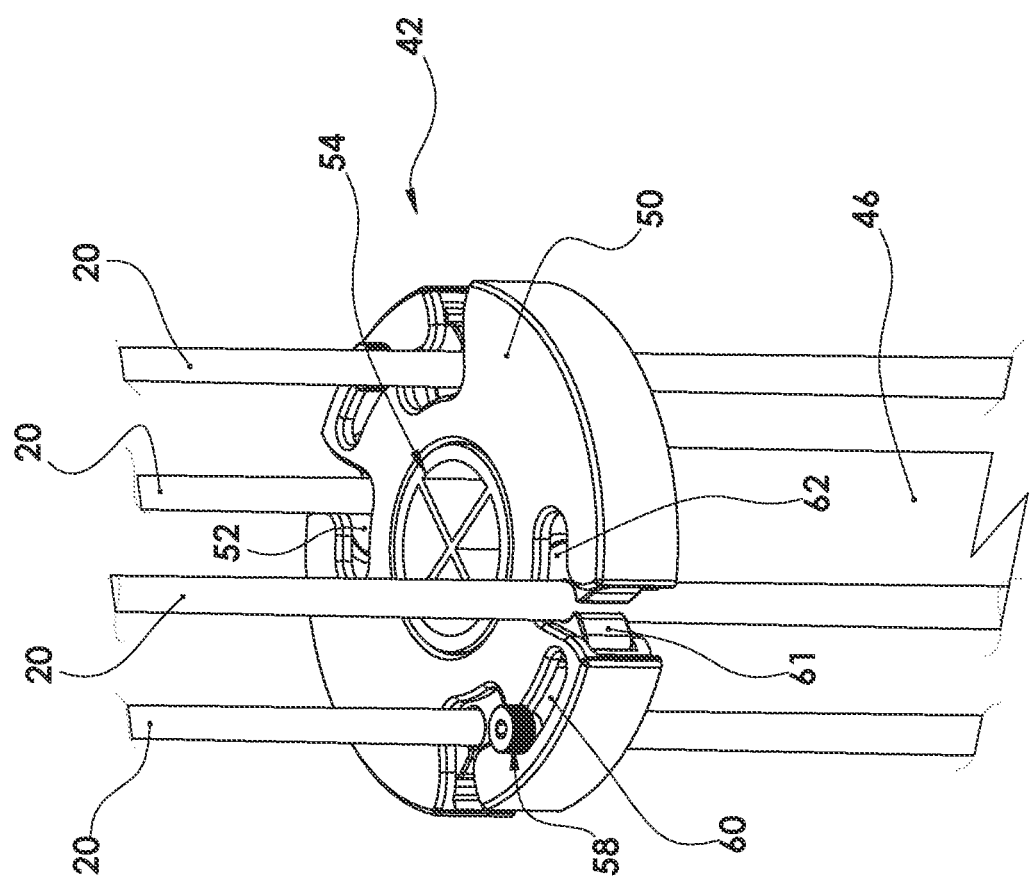
FIG. 4 is an enlarged perspective view showing an upper portion of the rack shown in FIG. 2 in an open position.
Figure 5:
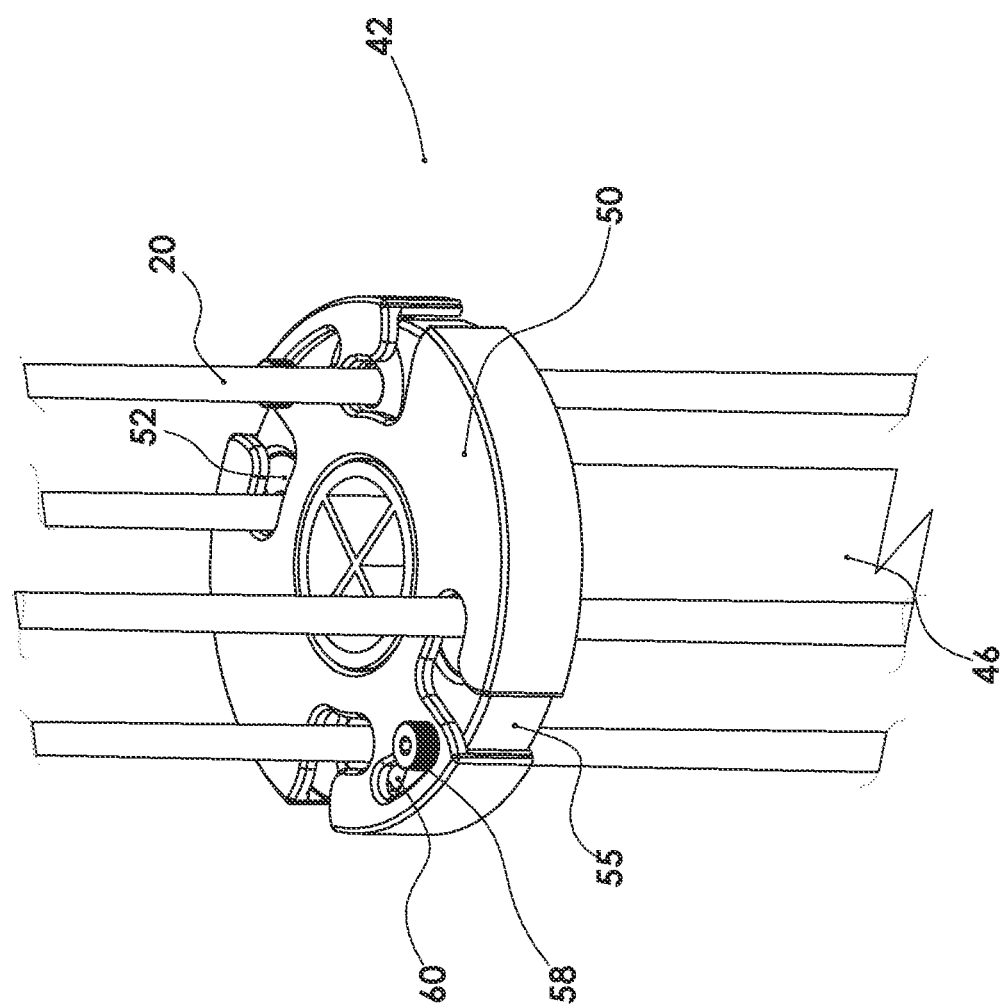
FIG. 5 is similar to FIG. 4 but shows the upper portion in a closed position.
Figure 6:
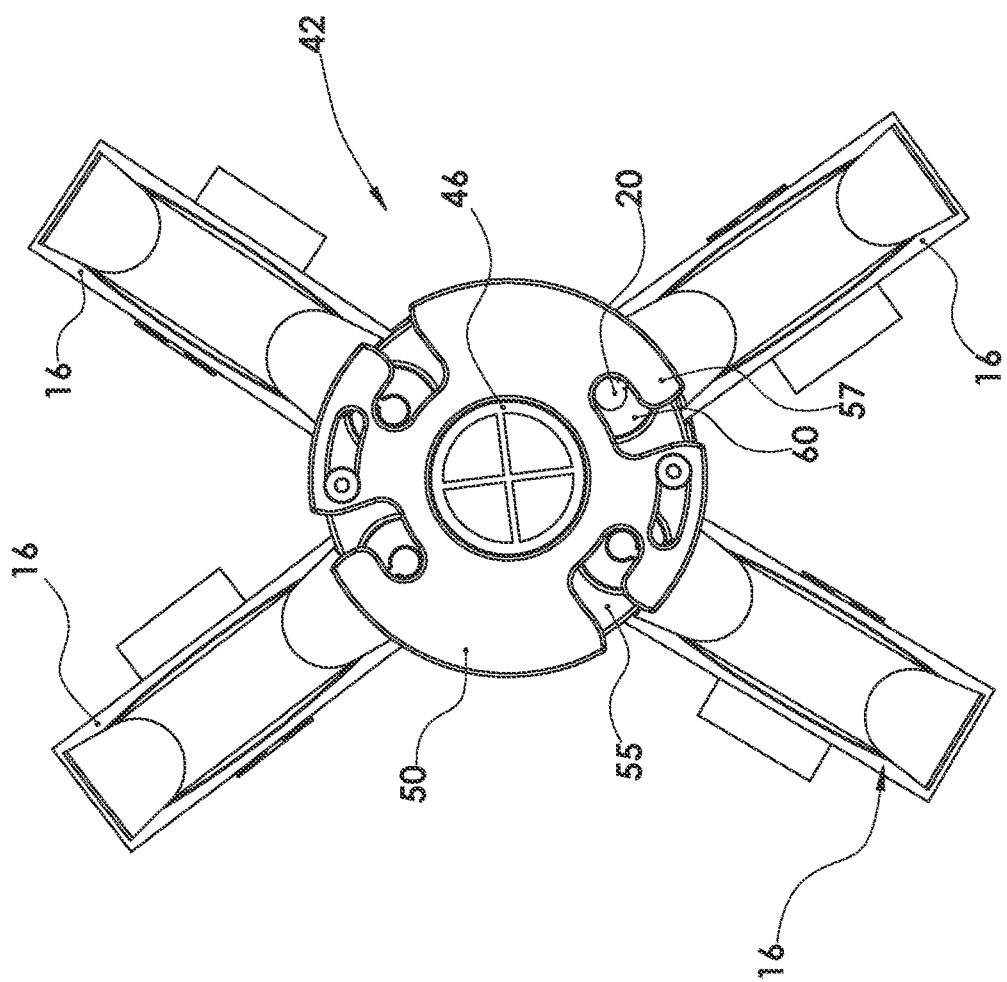
FIG. 6 is a top view of the upper portion of the rack in the closed position.

The upper portion 42 is shown in detail in FIGS. 4-6. The upper portion 42 includes a hollow disc-shaped outer member 50 having a plurality (four in the implementation shown) of L-shaped (when seen from above) open areas 52 that have openings at the perimeter of member 50 to receive the rod blanks 20 of fishing poles to be mounted in the rack. Member 50 also includes a central opening 54 to allow it to be mounted on the cylindrical support 46. The member 50 slides onto the cylindrical support and is rotatable relative thereto.

Figure 4A:
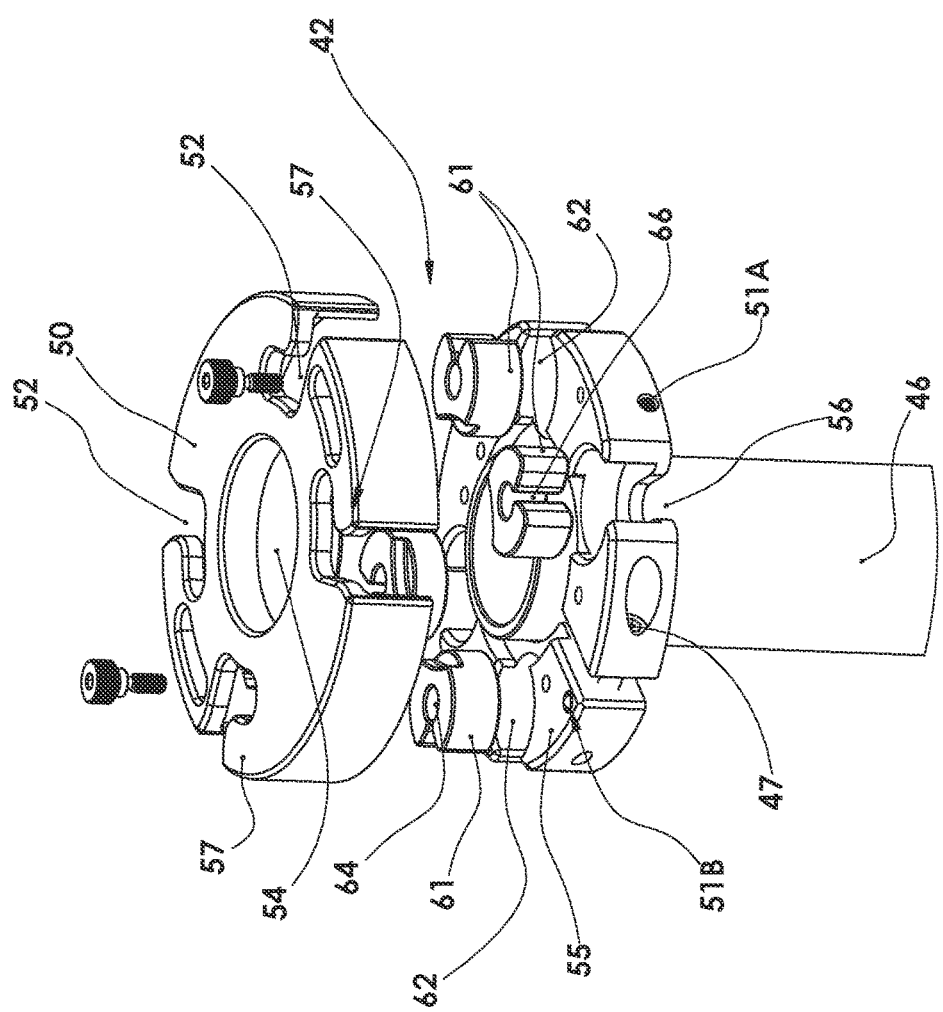
FIG. 4A is an exploded perspective view of the upper portion of the rack.
Figure 4B:
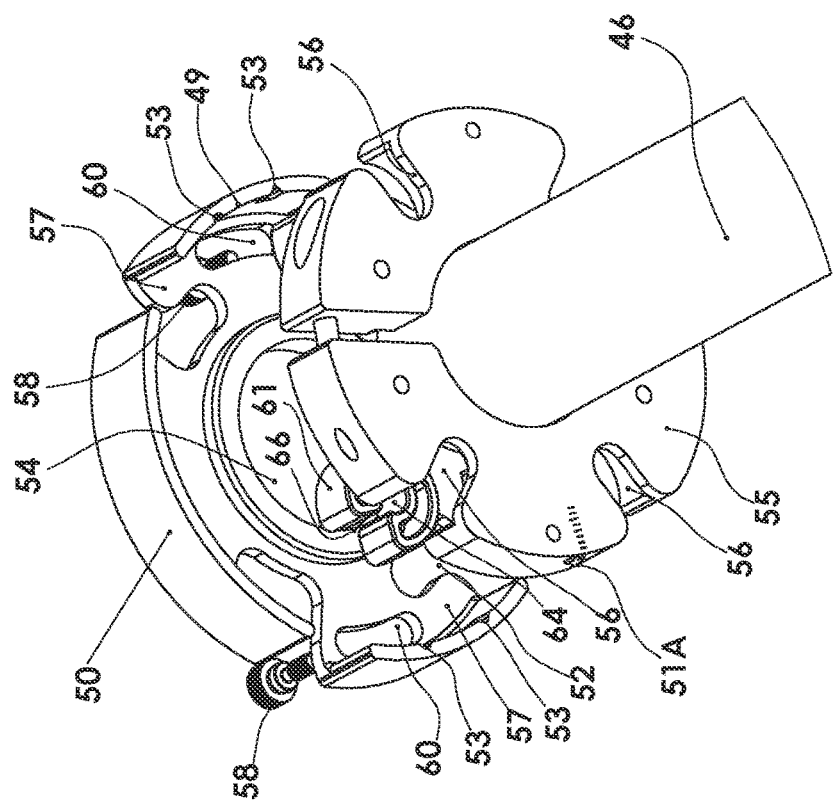
FIG. 4B is similar to FIG. 4A but taken from below.
Figure 4C:
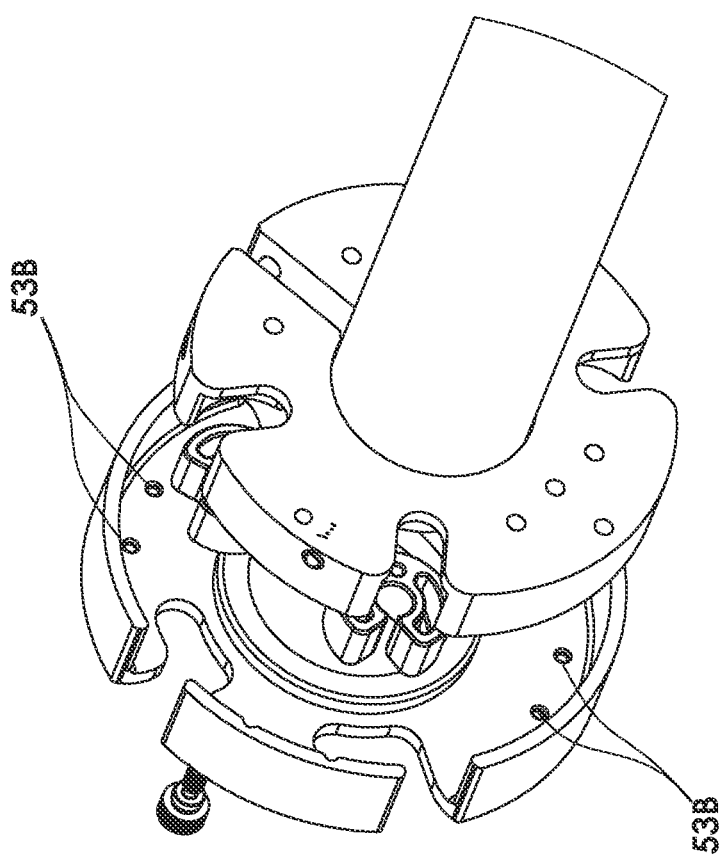
FIG. 4C is an exploded perspective view of the upper portion of a rack according to an alternative embodiment in which the detent slots are on the surface rather than around the perimeter.

Referring to FIGS. 4A and 4B, the upper portion 42 also includes an inner ring member 55 disposed within the hollow interior of the disc-shaped member 50 when assembled as shown in FIG. 4. Inner ring member 55 is fixedly mounted on the cylindrical support 46, e.g., by clamping it in place with screw 47 (FIG. 4A), such that the outer member 50 can rotate about the inner ring member 55. Inner ring member 55 includes slots 56 (FIG. 4B) radially spaced to correspond to the positions of the open areas 52 on the member 50. When the member 50 is rotated relative to the inner ring member 55, the leg portion 57 adjacent each opening 52 occludes or partly occludes the openings of slots 56 as shown in FIG. 6. The closure of the slots 56 by the leg portions 57 serves to securely lock the rod blanks in place in the upper portion 42 as shown in FIG. 5. The member 50 would rotates freely about member 55 but its rotational movement is limited by screws 58 which are fixedly attached (e.g., by threaded attachment, as shown) to the inner ring member 55 such that interaction of the two ends of grooves 60 with the shafts of the screws 58 serves as a stop. The engagement of the heads of the screws 58 with the upper surface of the member 50 also serves to attach the member 50 to the ring member 55. Referring to FIG. 4B, a pair of spring-loaded balls 51A (only one of which is visible) on the outer circumferential surface of the ring member 55 are configured to selectively engage slots 53 on the inner surface of side wall 49, acting as detents to releasably hold the ring member 55 in the open and closed positions of the upper portion 42. As shown in FIG. 4A, a second set of balls 51B is provided on the top surface of the inner ring member 55. These balls 51B engage a second set of detent slots 53B, positioned on an under surface of member 50 (FIG. 4C).

The upper portion 42 can include both sets of balls/slots or just one set or the other, depending on the degree of engagement desired. The second set 51B/53B may be easier to manufacture.

As shown in FIG. 4A, the upper portion 42 also includes grippers 61 that fit inside cavities 62 in the inner ring member 55. Grippers 61 are of a resilient material, e.g., an elastomeric material or a foam, and serve to surround and protect the rod blank. Each gripper 61 includes a central bore 64 for holding the rod blank, and a slit 66 to allow the rod blank to be pushed into the central bore. The bore 64 is sufficiently smaller in diameter than the rod blank 20 to provide a small interference between the elastomeric material and the rod blank, creating enhanced friction to retain the blank 20 when the locking ring 50 is in the open position. The soft, resilient nature of the grippers also damps the vibration of the rods, e.g., during the rocking and jostling of a vehicle or watercraft.

Figure 7:
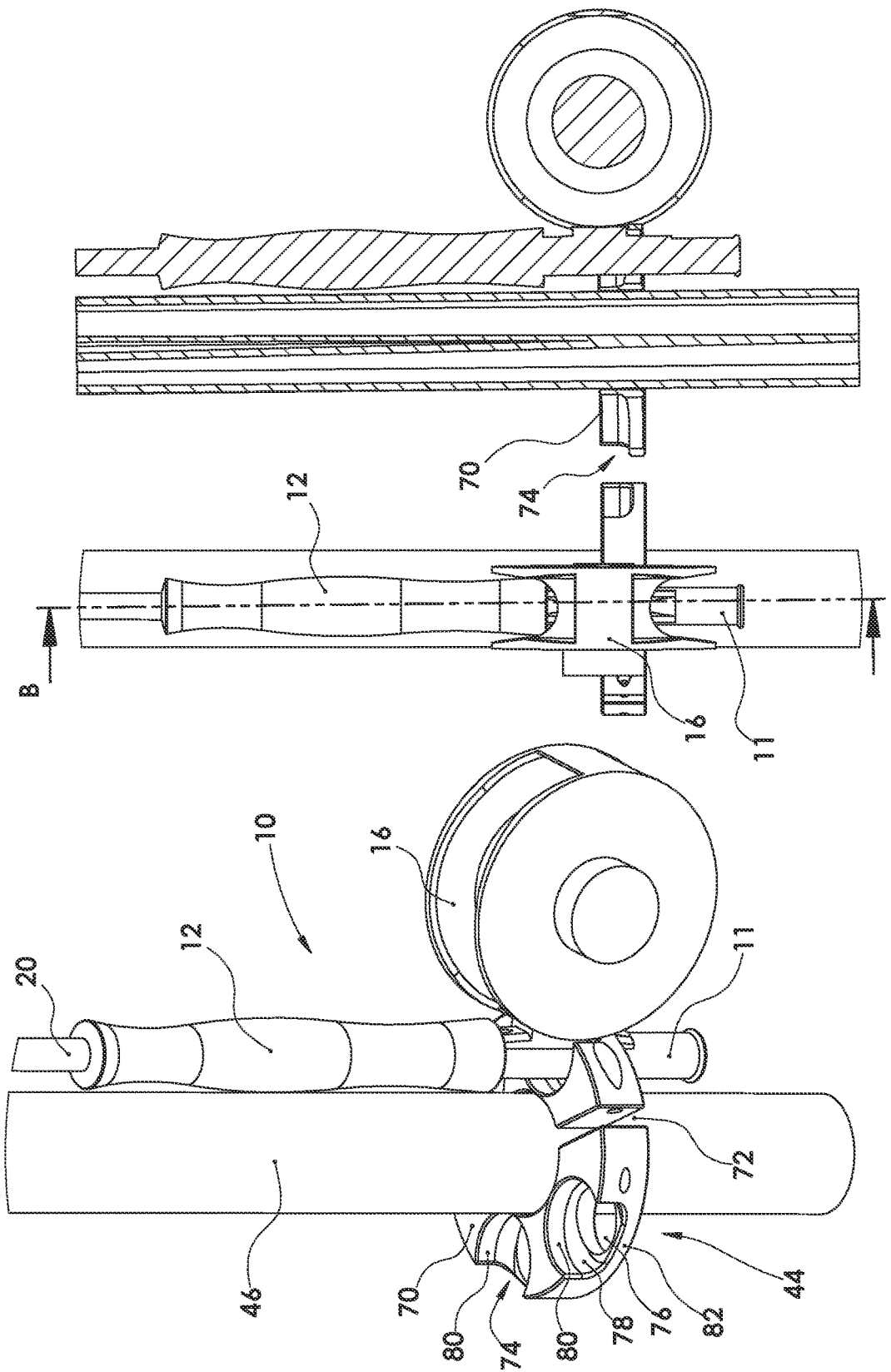
FIG. 7 is an enlarged perspective view of a lower portion of the rack with a rod in place.
Figure 8:
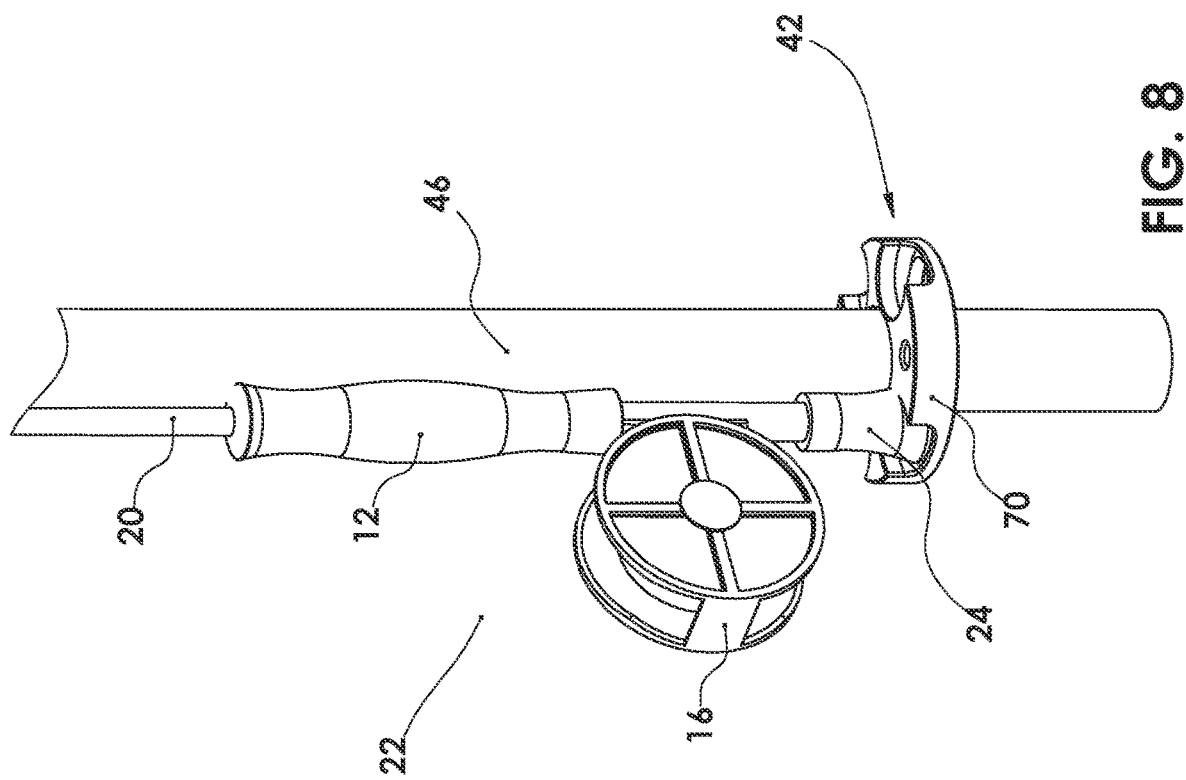
FIG. 8 is an enlarged perspective view of the lower portion of the rack with a different type of rod (fighting butt) in place.

Referring now to FIGS. 7-8, the lower portion 44 of the rack is in the form of a ring member 70 that is fixedly attached to the cylindrical support 46, e.g., by clamping it onto the cylindrical support 46 using a screw (not shown) that extends across open area 72 (FIG. 7). The ring member 70 includes a plurality of handle supporting areas 74 that are aligned radially with the slots of ring member 55 of the upper portion 42 when the rack is assembled. Each handle supporting area 74 includes a through hole 76 and a floor area 78 surrounding the through hole 76. A side wall 80 extends vertically from the periphery of the floor area 78, forming a generally cylindrical cavity. The floor area 78 also defines a rim 82 at the perimeter of the ring member 70.

Figure 1:
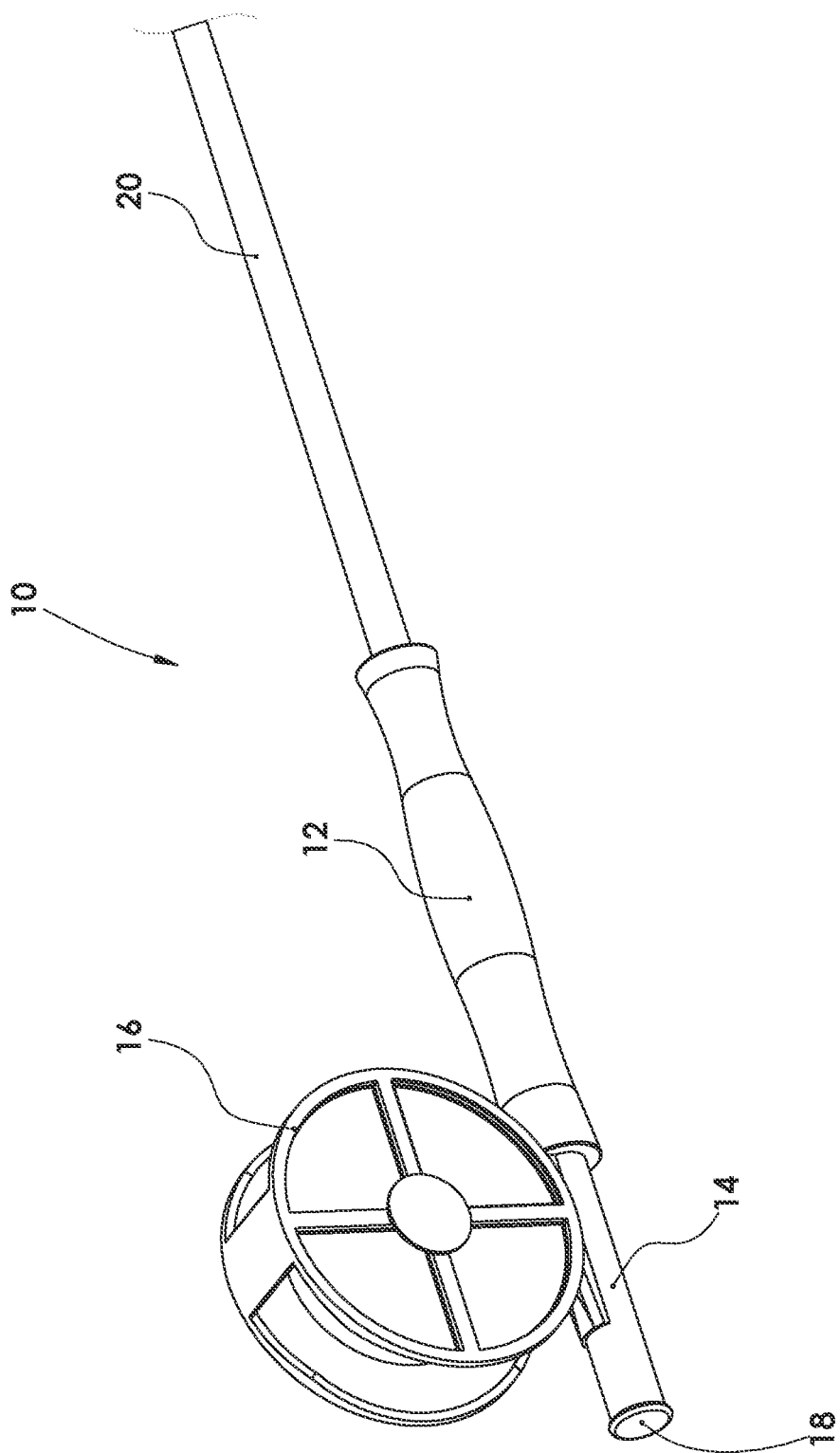
FIG. 1 is a perspective view of a fly fishing rod.
Figure 1A:
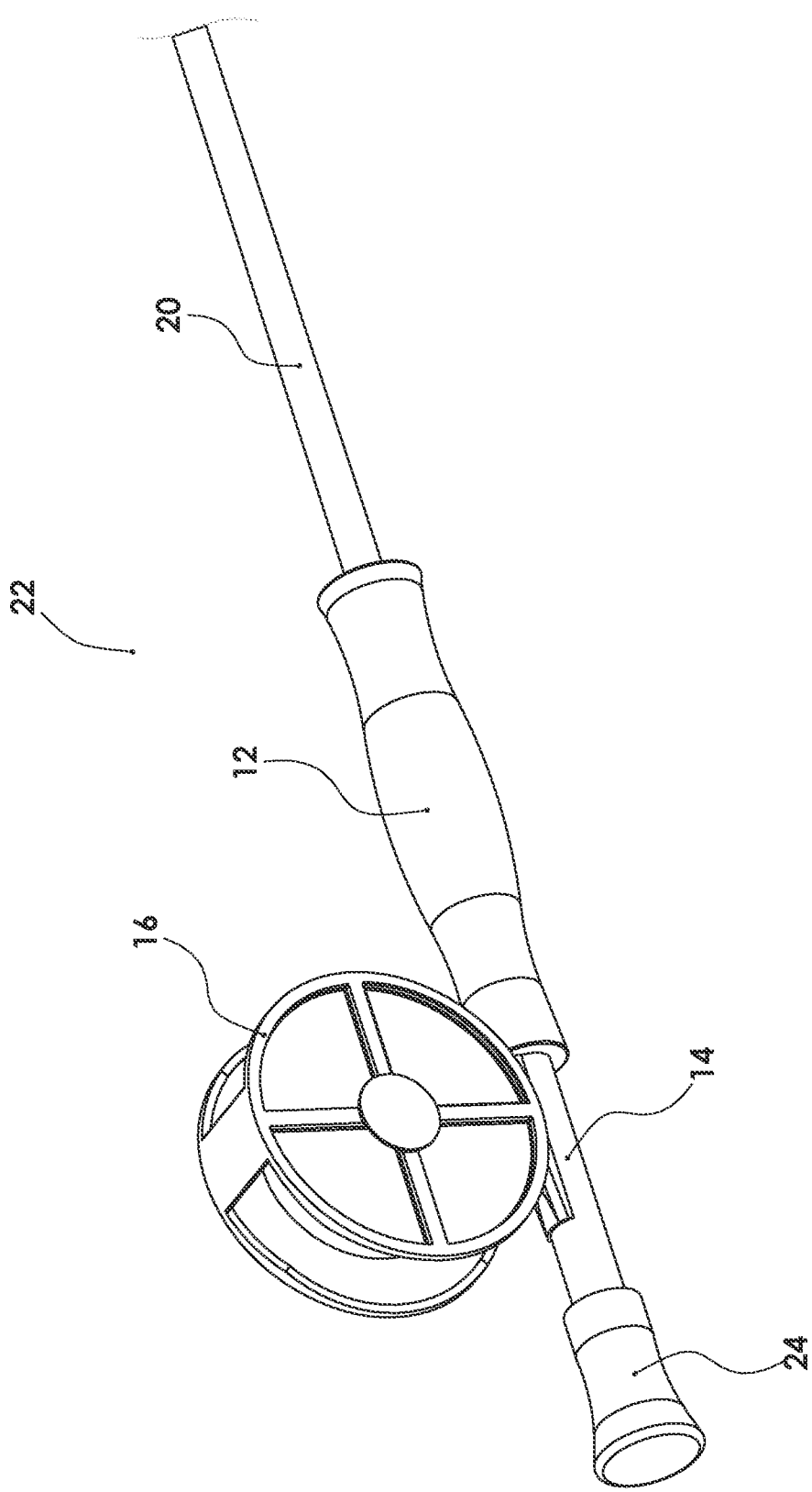
FIG. 1A is a perspective view of a fly rod with an extended portion behind the reel.
Figure 1B:
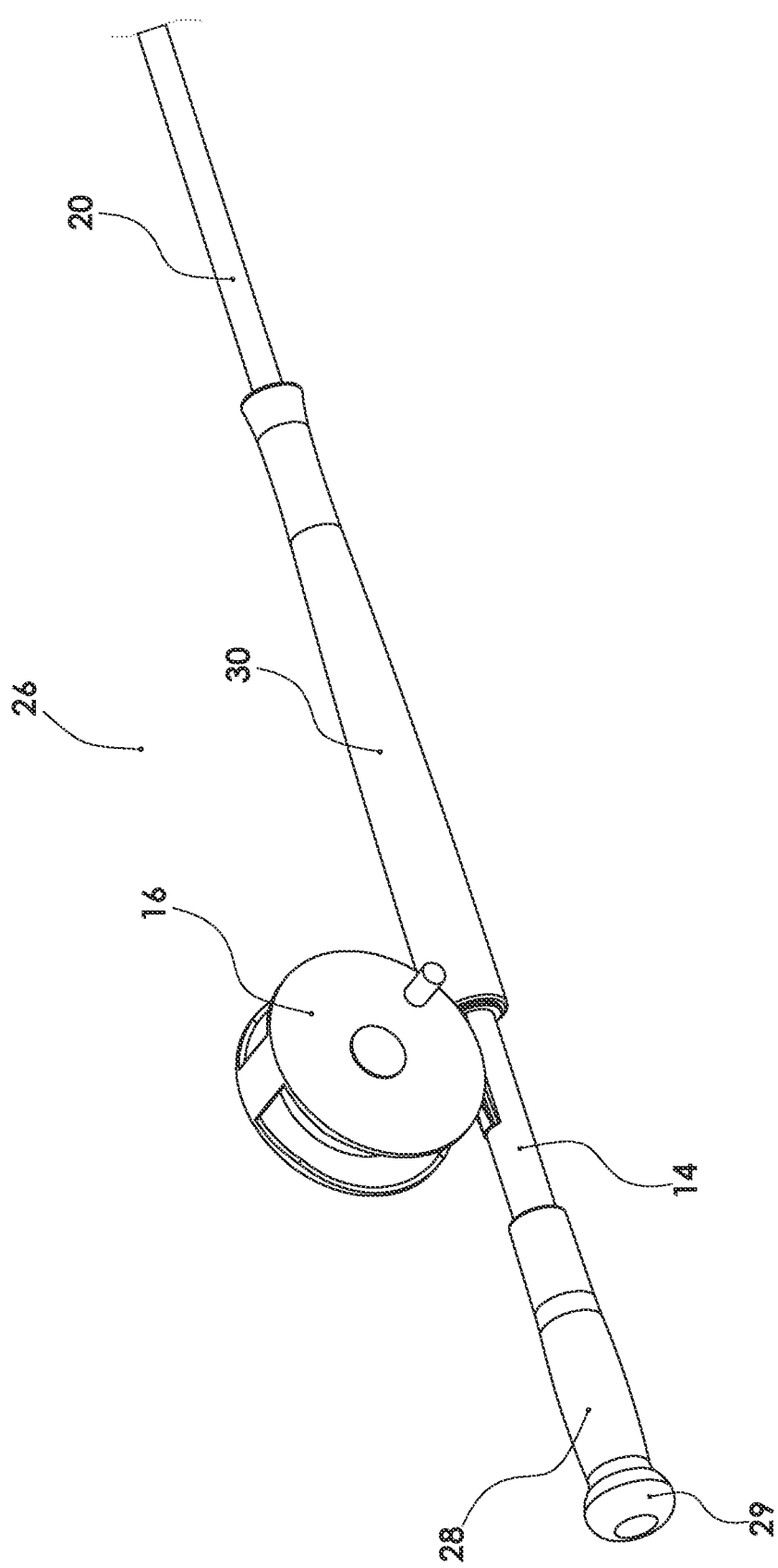
FIG. 1B is a perspective view of a spey rod.
Figure 1C:
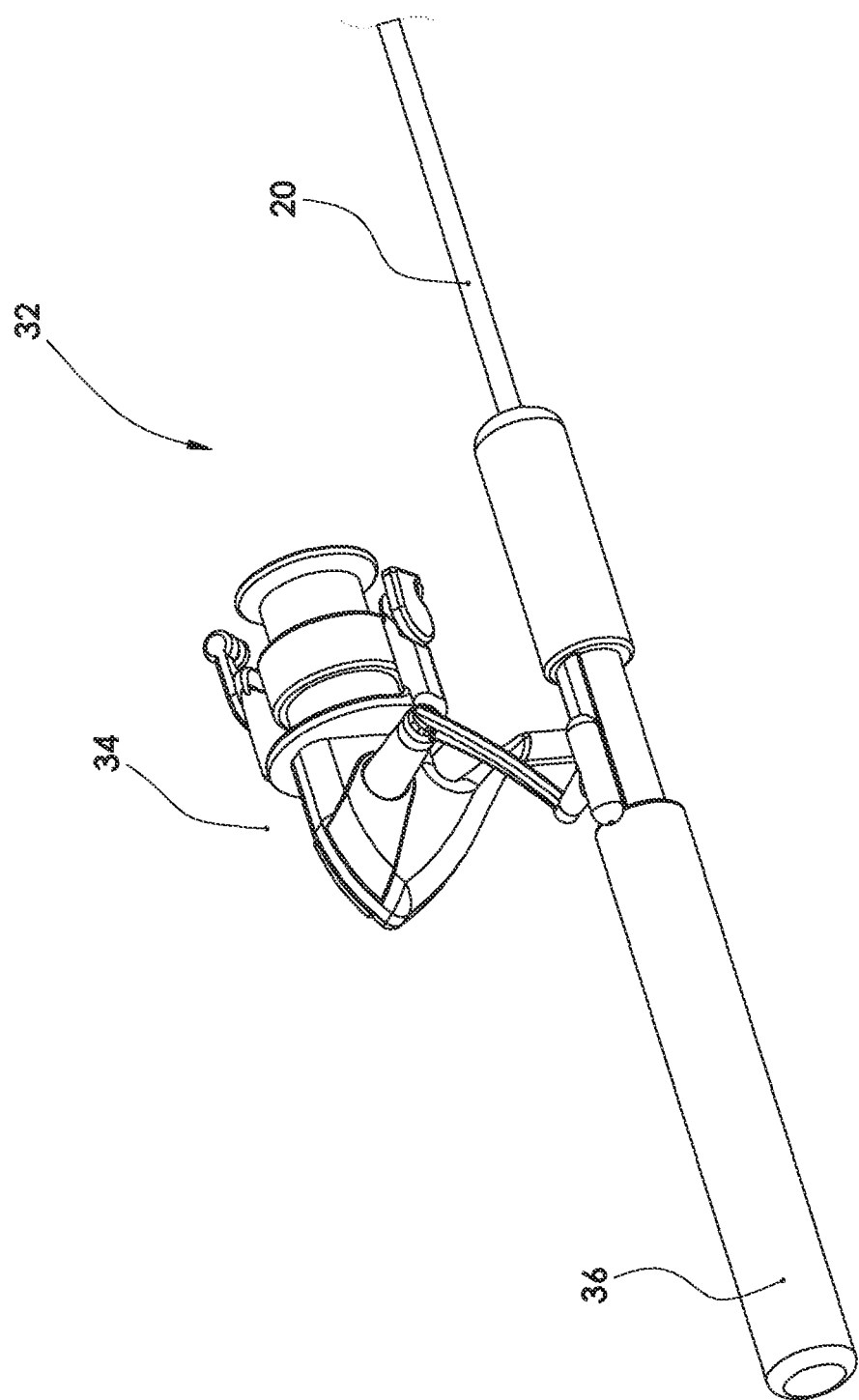
FIG. 1C is a perspective view of a standard spin fishing rod.
Figure 9:
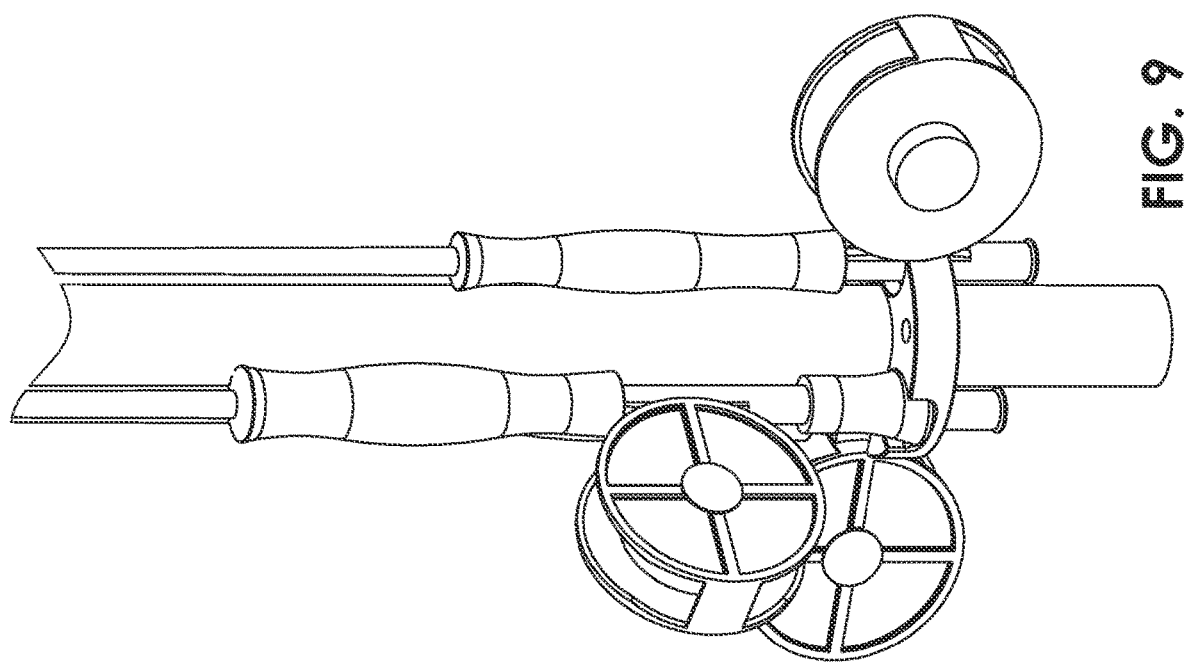
FIG. 9 is an enlarged perspective view of the lower portion of the rack with several different types of rods in place.
Figure 9A:
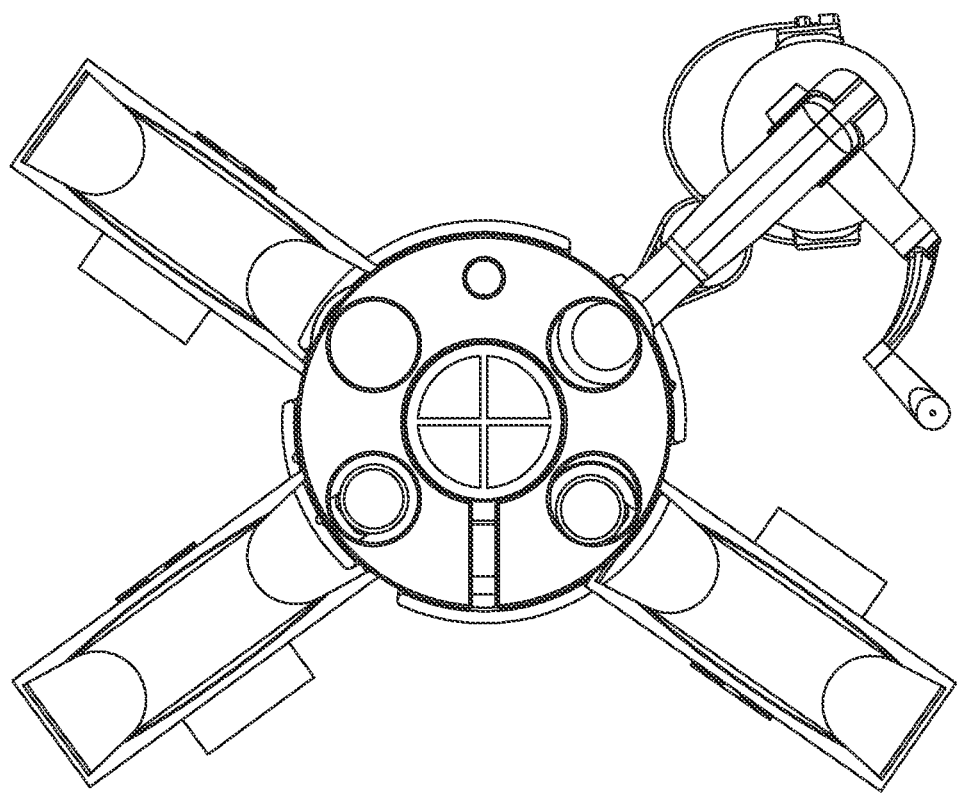
FIG. 9A is a bottom planar view of the arrangement shown in FIG. 9.

In use, a standard fly rod 10 such as that shown in FIG. 1 can be inserted into the rack such that its butt 11 extends into through hole 76 and reel 16 is supported by rim 82. The rim 82 catches behind the reel and engages the reel diameter, preventing the rod from rotating. Cylindrical support 46 extends behind handle 12 and stabilizes the handle end of the rod in the rack. Alternatively, as shown in FIG. 8, a rod 22 with an extended "fighting butt" portion 24 can be supported on the rack by placing the portion 24 in the cavity defined by floor area 78, rather than having the butt extend through the through hole 78. The side wall 80 contains the butt and minimizes lateral movement. FIGS. 9 and 9A show a variety of different types of rods all being supported by the lower portion 44.

Figure 11:
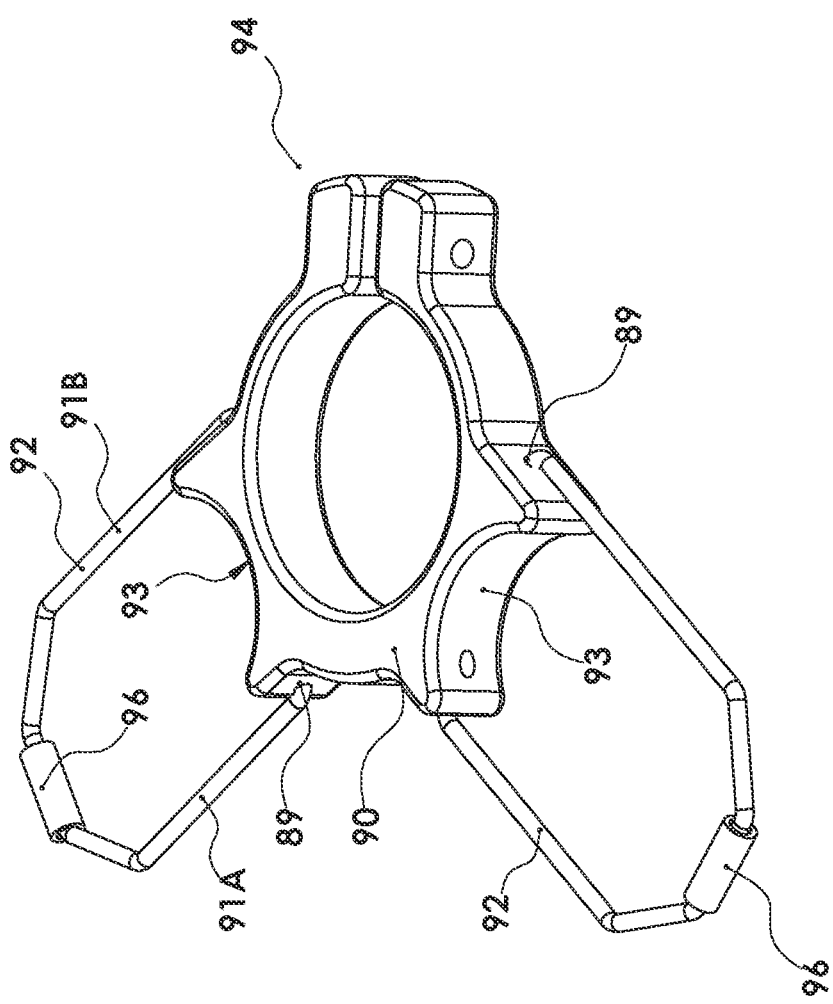
FIG. 11 is a perspective view of the lower portion shown in FIG. 10.
Figure 12:
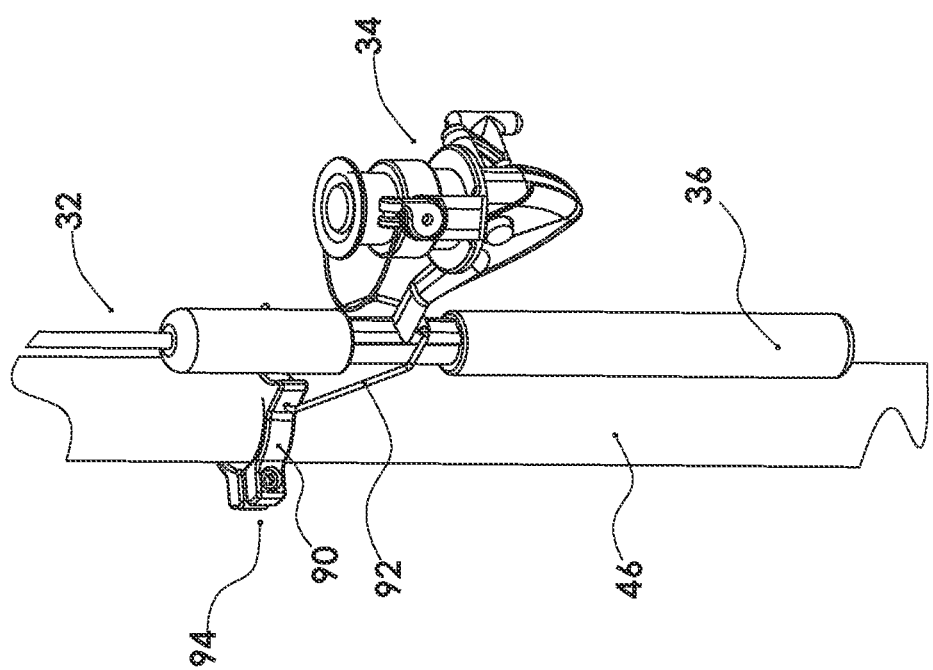
FIG. 12 is an enlarged perspective view of the lower portion shown in FIGS. 10 and 11, with the lower portion supporting a spin fishing rod.

FIGS. 10-12 show an alternative type of lower portion, that may be used instead of or in addition to the lower portion 44 described above. In this embodiment, a ring member 90 includes a plurality of generally U-shaped wire holsters 92 that are configured to receive the butt of a fishing rod and then support the rod from below the reel 16 as shown in FIG. 10. This embodiment is particularly useful for holding larger-butt fly rods such as spey rods (FIG. 10) and spin fishing rods (FIG. 12). However, the holsters accommodate any rod/reel combination, including the smallest traditional rods, the largest Spey rods, and traditional spin fishing rods.

The proximal ends of holsters 92 are pivotably mounted in holes 89 of the ring member 90, so that the loop of each holster is movable between an "open" (maximum area for rod insertion) position in which the loop is substantially perpendicular to the longitudinal axis of the cylindrical support 46, and a "closed" position, in which the loop is deflected downward towards the outer surface of the cylindrical support. The holsters are configured to spring back to their normal, "open" position when they are not being held down by a user or by the force of the reel of a rod inserted in the holster (or a rod blank extending adjacent the holster if the butt of the rod is being supported by the lower portion 44). Referring to FIG. 11, this return force is provided by having the legs 91A, 91B of the holster be of different lengths and the holes 89 in which they are mounted being offset. This offset causes the wire of the loop to deform and be in tension when flexed downward towards the closed position, in the same manner as the wire gate of a wire gate carabiner. When the downward force is released the tension in the wire causes the holster to return to its normal, open position, allowing the holster to be ready for rod insertion.

The angles and geometry of the wire loop center the reel and engage the reel diameter when in the bottom position, preventing the rod from excessively rotating.

Each of the holsters 92 includes a roller 96 at its distal end. Roller 96 rotates freely on the wire, facilitating the insertion of the rod and reducing friction during insertion to protect the rod surface. The roller 96 also, by having a larger diameter than the wire, creates a larger engagement surface to protect the reel when the rod is in place in the rack. In some implementations the roller is formed of a material that is softer than the wire, e.g., Nylon or other thermoplastic material. The ring member 90 includes arcuate surfaces 93 (FIG. 11) that are configured to receive and support the rod handle, as can be seen in FIGS. 10 and 12.

Referring to FIG. 11, the ring member 90 includes a clamp portion 94, to allow it to be removably attached to the cylindrical support 46. Because both ring member 90 and ring member 70 are releasably clamped onto the cylindrical support 46 either one can be used independently of the other. Also, because the holsters 92 are pivotably mounted on the ring member 90 they can be bypassed by pressing them downward toward the cylindrical support 46 when not in use. (The presence of the rod blanks of rods supported by the lower portion 44 will overcome the relatively low return force of the loops hold the holsters in place in the stowed position.)

Figure 13:
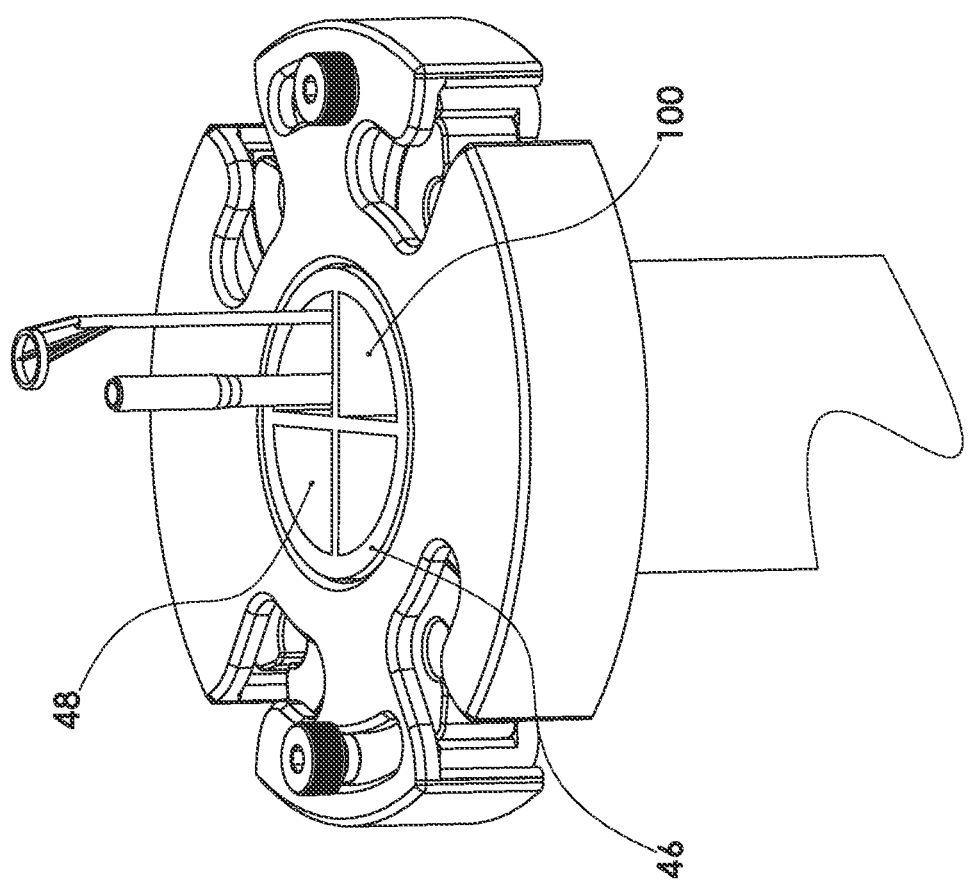
FIG. 13 is an enlarged perspective view of the upper portion of the rack, showing a central portion in use storing rod segments.

Referring to FIG. 13, as noted above the cylindrical support 46 includes a segmented bore 48 for storage of rod sections. The bore includes walls 100 that define four wedge-shaped chambers, to protect the rod sections and keep the rod sections for different rods separated.

Figure 14A:
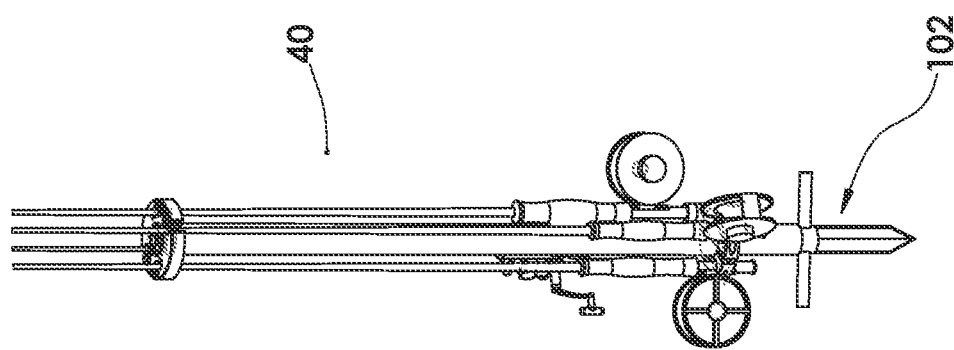
FIG. 14A shows the rack and ground stake of FIG. 14 assembled.
Figure 14:
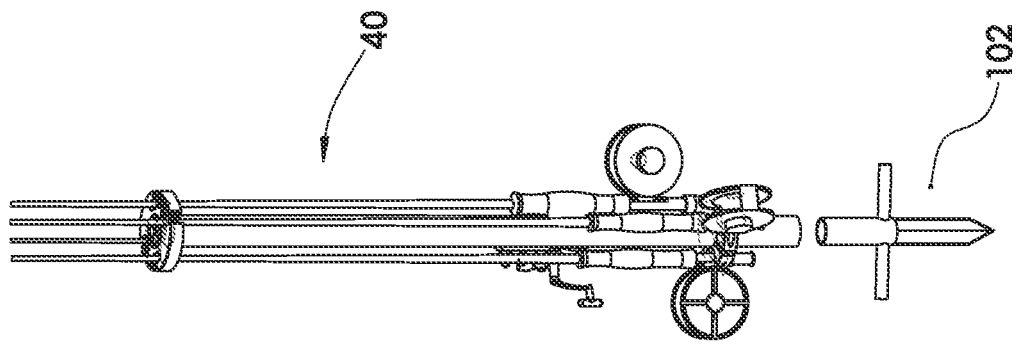
FIG. 14 is a perspective view showing a rack and ground stake exploded.
Figure 15:
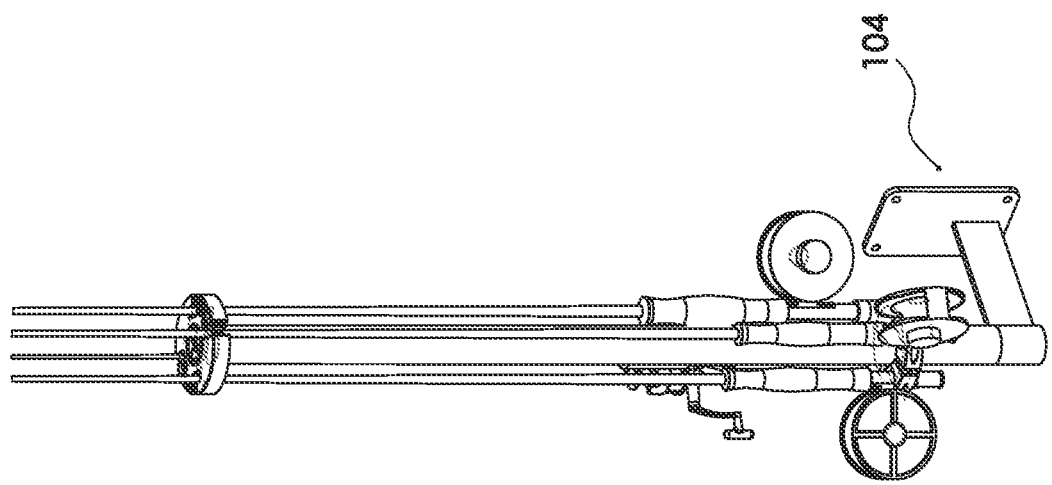
FIG. 15 is a perspective view of a rack assembled with a wall mount.
Figure 16:
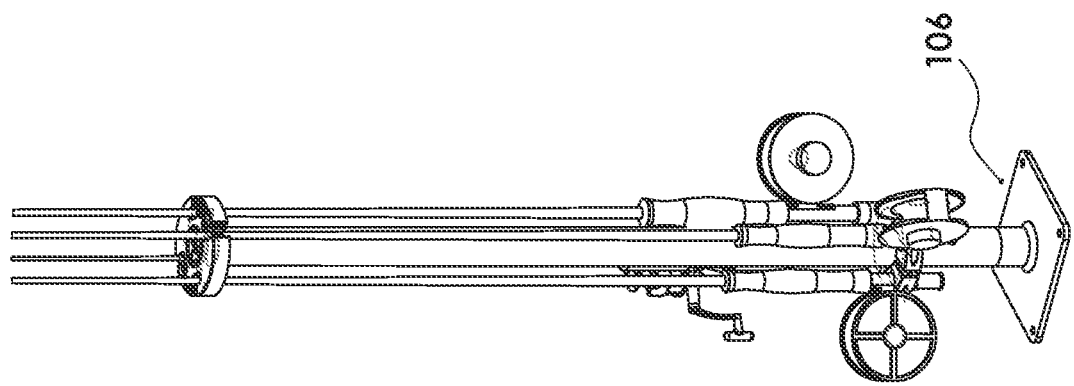
FIG. 16 is a perspective view of a rack assembled with a flat mount.
Figure 17:
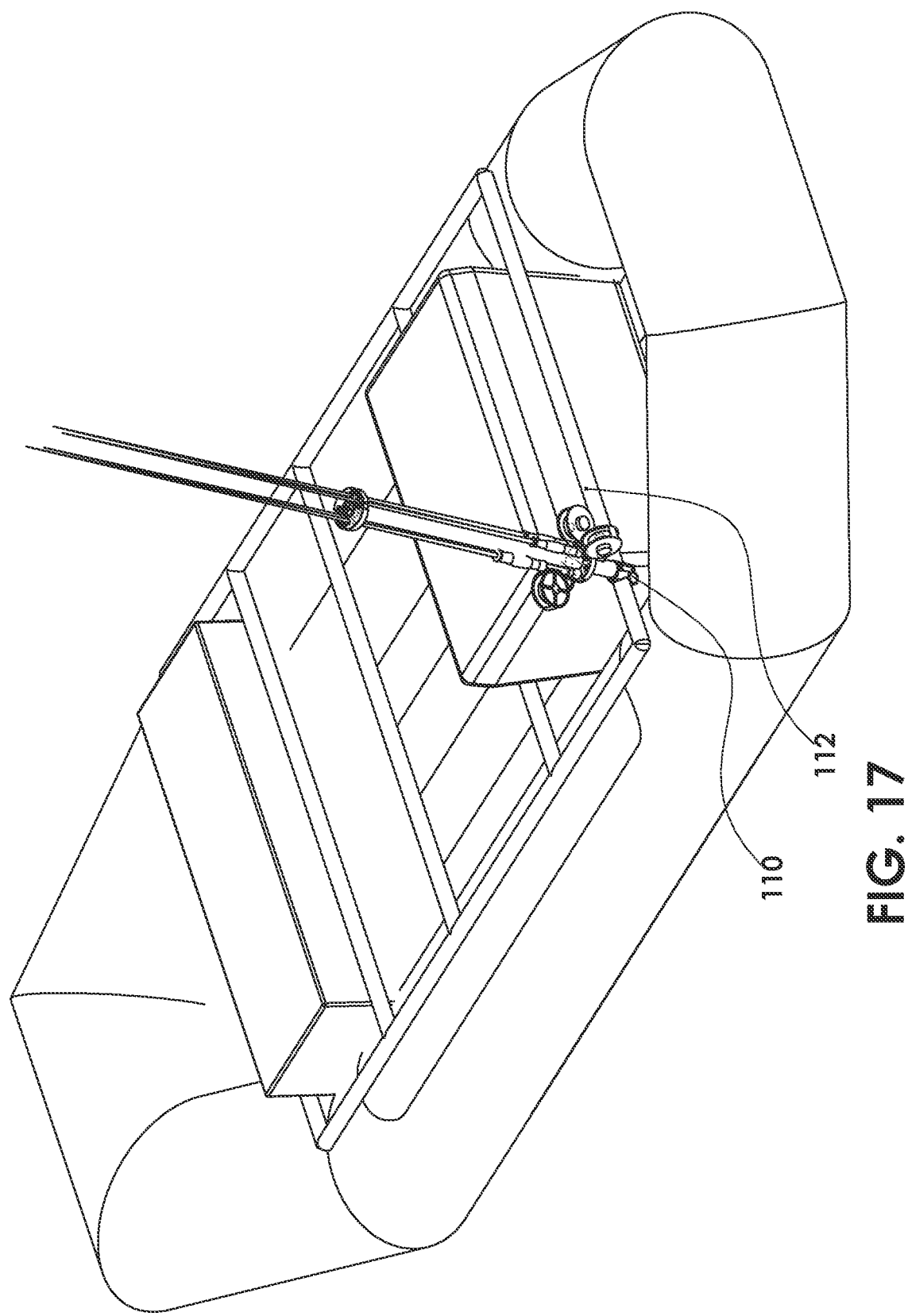
FIG. 17 is a perspective view of a rack mounted on a tube frame of a raft.

FIGS. 14-16 show different mounting arrangements for the rack 40. When outdoor storage is desired, the rack can be mounted vertically using a ground stake 102, as shown in FIGS. 14-14A. For indoor storage, e.g., in a garage, the rack can be mounted on a wall mount 104 (FIG. 15) or a flat mount 106 (FIG. 16). The wall mount 104 or flat mount 106 can be used to mount the rack in an aluminum boat or the roof of a pickup canopy. The rack can also be clamped to the tube frame of a raft or to the roof rack of a vehicle using commercially available fittings. For example, as shown in FIG. 17 the lower end of the cylindrical support 46 can be threaded into a fitting 110 (e.g., an NRS LoPro™ Frame Fitting) which can then be releasably clamped to a tubular frame member 112 of the tube frame of a raft 114.

OTHER EMBODIMENTS

A number of embodiments have been described. Nevertheless, it will be understood that various modifications may be made without departing from the spirit and scope of the disclosure.

For example, while the upper portion 42 is shown as being flush with the top edge of the cylindrical support 46, the upper portion 42 can be clamped lower on the cylindrical support 46 if desired, such that the cylindrical support 46 extends beyond the upper portion 42.

Moreover, while it is preferred that the upper portion 42 include the outer member 50 to provide the locking functionality described above, in some implementations the outer member 50 can be omitted and the grippers 61 be used to retain the rods, alone or in combination with a strap (not shown), e.g. an elastomeric Voile Strap®, wrapped around the perimeter of the ring member 55. In such implementations it may be desirable to adhere the bottom surfaces of the grippers 61 to the facing surfaces of cavities 64 if the compression of the resilient material in the cavity is not sufficient to hold the grippers 61 securely in place.

Alternatively, while it is desirable to include the grippers 61 to protect and cushion the rod blanks and assist in holding them in place, in implementations that include the outer member 50 to lock the rod blanks in place the grippers 61 could be omitted. If the grippers are not used other measures may be taken to protect the rod blanks, for example the rod blank-receiving areas may be sized to relatively closely fit the rod blank to minimize lateral movement and/or the inner ring member 55 may be made entirely of a resilient material.

If desired, a surface, e.g., the inner surface, of the upper end of the cylindrical support 46 may be threaded, to receive a threaded cap (not shown) similar to a fly rod tube. The threaded surface may also be utilized to attach other components, e.g., extensions of the cylindrical support 46 or accessories such as a camera mount or drying rack, to the upper end of the cylindrical support.

While it is generally preferred that the cylindrical support be cylindrical (round in cross-section), an elongated support having a desired cross-section (e.g., elliptical, square, rectangular, etc.) may be used and the geometry of the support-facing surfaces of the ring members 55, 70 and 90 adjusted to conform to the geometry of the outer surface of the elongated support. The term "tubular member", as used herein, refers collectively to elongated supports regardless of cross-sectional shape.

Figure 18:
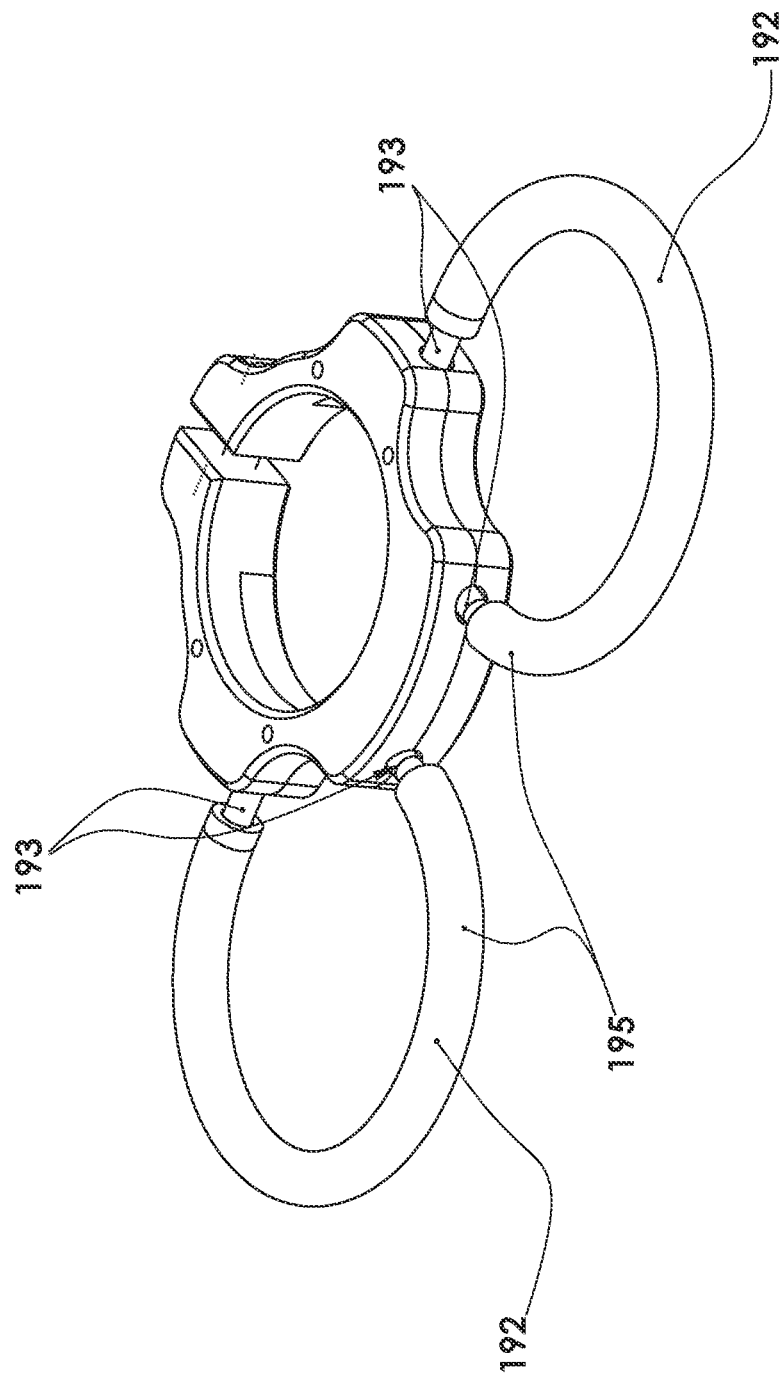
FIG. 18 is an enlarged perspective view showing a lower portion according to an alternative embodiment in which the handle end of the rod is supported by a loop of cord.

In addition, instead of the U-shaped wire holsters 92 shown in FIG. 10, as shown in FIG. 18 the lower portion 44 can include a plurality of loops 192 of cord or rope 193 enclosed in a flexible sleeve of polymeric tubing 195. This embodiment would be suitable, for example, for holding spey rods.

In some implementations, the rack may be configured to carry more or fewer rods than shown in the drawings, for example from 2 to 6 rods.

Accordingly, other embodiments are within the scope of the following claims.

What is claimed is:

1. A fishing rod rack configured to receive one or more fishing rods, each rod including a base and a rod blank extending from the base, the rack comprising:
    an elongated rigid tubular member;
    a rod base support, configured to receive the one or more bases, mounted adjacent a first end of the tubular member; and
    a rod blank support, configured to receive the one or more rod blanks, mounted on the tubular member spaced from the rod base support, the rod blank support comprising
    (a) at least one rod blank-receiving portion including a resilient gripping member configured to surround a major portion of the circumference of the rod blank and maintain the rod blank in a position in which a longitudinal axis of the rod blank extends parallel to a longitudinal axis of the tubular member;
    (b) a housing defining a cavity in which the resilient gripping member is disposed, the housing extending radially around the tubular member and being fixedly mounted thereto and having at least one open area configured to allow the rod blank to be inserted into the gripping member; and
    (c) an outer member mounted radially around the tubular member and over the housing, the outer member being rotatable relative to the housing between an open position, in which the rod blank can be inserted into and removed from the gripping member, and a closed position in which the rod blank is locked in the rod blank support.

2. The rack of claim 1 wherein the rod base support and the rod blank support each extend radially around a circumference of the tubular member.

3. The rack of claim 2 wherein the tubular member is cylindrical.

4. The rack of claim 1 wherein the rod base support includes at least one rod base-receiving portion having a through hole configured to receive a fishing rod butt having a first diameter and a floor configured to receive a fishing rod butt having a second, larger diameter.

5. The rack of claim 1 wherein the rotation of the outer member relative to the housing is limited by stops.

6. The rack of claim 1 further comprising detents configured to retain the outer member in the open and closed positions.

7. The rack of claim 1 wherein the rod base support is mounted to be removable by a user.

8. The rack of claim 1 wherein the rod base support comprises a mount and at least one wire holster extending radially from the mount, the wire holster having a loop configured to receive a fishing rod butt and support the fishing rod from under a reel.

9. The rack of claim 8 wherein the mount extends radially around the tubular member.

10. The rack of claim 8 wherein the wire holster is configured to be biased towards an open position in which the loop extends generally perpendicular to a longitudinal axis of the tubular member.

11. The rack of claim 10 wherein the proximal ends of the loop are pivotably mounted on the mount in an offset manner so as to create tension in the loop when the loop is deflected away from the open position.

12. The rack of claim 1 wherein the tubular member includes a central cavity configured for storage of a plurality of rod sections.

13. The rack of claim 12 wherein the central cavity is segmented to allow the rod sections to be segregated into groups.

14. The rack of claim 1 wherein the gripping member is formed of an elastomeric member or a foam.

15. The rack of claim 14 wherein the gripping member is generally cylindrical and includes a slit through which the rod blank can be pressed, and a bore into which the rod blank is received, a length of the slit and a longitudinal axis of the bore extending generally parallel to a longitudinal axis of the tubular member.

16. A method of storing one or more fishing rods, each rod having a base and a rod blank extending from the base, the method comprising
providing a fishing rod rack comprising (a) an elongated rigid tubular member; (b) a rod base support, configured to receive the one or more bases, mounted adjacent a first end of the tubular member; and (c) a rod blank support, configured to receive the one or more rod blanks, mounted on the tubular member spaced from the rod base support the rod blank support comprising
(a) at least one rod blank-receiving portion including a resilient gripping member configured to surround a major portion of the circumference of the rod blank and maintain the rod blank in a position in which a longitudinal axis of the rod blank extends parallel to a longitudinal axis of the tubular member;
(b) a housing defining a cavity in which the resilient gripping member is disposed, the housing extending radially around the tubular member and being fixedly mounted thereto and having at least one open area configured to allow the rod blank to be inserted into the gripping member; and
(c) an outer member mounted radially around the tubular member and over the housing, the outer member being rotatable relative to the housing between an open position, in which the rod blank can be inserted into and removed from the gripping member, and a closed position in which the rod blank is locked in the rod blank support;
inserting the base of the rod into the rod base support; and
inserting a portion of the rod blank into the rod blank support.

17. The method of claim 16 further comprising locking the rod blank in place in the rod blank support.

18. The method of claim 16 further comprising removing rod sections from the rod blank and storing the rod sections in a central cavity of the tubular member.

* * * * *